(12) United States Patent
Noda et al.

(10) Patent No.: US 11,935,563 B2
(45) Date of Patent: Mar. 19, 2024

(54) TAPE DRIVE HAVING INDEPENDENTLY CONTROLLED TILTING TANDEM TAPE HEADS

(71) Applicant: Western Digital Technologies, Inc., San Jose, CA (US)

(72) Inventors: Junzo Noda, Fujisawa (JP); Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 91 days.

(21) Appl. No.: 17/691,904

(22) Filed: Mar. 10, 2022

(65) Prior Publication Data
US 2023/0290377 A1    Sep. 14, 2023

(51) Int. Cl.
*G11B 21/10*    (2006.01)

(52) U.S. Cl.
CPC .................................. *G11B 21/103* (2013.01)

(58) Field of Classification Search
None
See application file for complete search history.

(56) References Cited

U.S. PATENT DOCUMENTS

| | | | | |
|---|---|---|---|---|
| 3,913,137 | A * | 10/1975 | Morgan | G11B 5/5521 360/98.02 |
| 4,600,953 | A * | 7/1986 | Furuhata | G11B 15/14 386/206 |
| 4,875,127 | A * | 10/1989 | McClure | G11B 15/602 |
| 5,055,956 | A * | 10/1991 | Kaya | G11B 5/4893 |
| 5,377,059 | A * | 12/1994 | Lee | G11B 15/61 |
| 5,661,616 | A | 8/1997 | Tran et al. | |
| 5,680,278 | A * | 10/1997 | Sawtelle, Jr. | G11B 5/5504 |
| 7,239,465 | B1 * | 7/2007 | Watson | G11B 5/00826 |
| 7,359,160 | B2 | 4/2008 | Koga et al. | |
| 7,724,465 | B2 | 5/2010 | Koeppe | |
| 9,214,164 | B2 | 12/2015 | Biskeborn et al. | |
| 9,275,666 | B1 | 3/2016 | Vanderheyden et al. | |

(Continued)

FOREIGN PATENT DOCUMENTS

WO    9718555 A1    5/1997

OTHER PUBLICATIONS

Boettcher, Uwe et al., "Design of a Dual Stage Actuator Tape Head Controller", ASME Information Storage and Processing Systems Conference, 2008, pp. 1-3, <http://maeresearch.ucsd.edu/callafon/publications/2008/isps08.pdf>.

*Primary Examiner* — Peter Vincent Agustin
(74) *Attorney, Agent, or Firm* — PATTERSON + SHERIDAN, LLP; Steven H. VerSteeg

(57) ABSTRACT

The present disclosure generally relates to a tape drive. The tape drive comprises a first tape head and a second tape head linearly aligned with one another, where the first tape head and the second tape head are configured to concurrently operate. The first tape head and the second tape head each comprise a plurality of write transducers, a plurality of read transducers, and a plurality of servo transducers. The tape drive further comprises a first actuator coupled to the first tape head and a second actuator coupled to the second tape head. The first and second actuators are configured to independently tilt and move the first and second tape heads, respectively. Tilting and moving the first and second tape heads individually enables the tape drive to compensate for non-linear tape dimensional stability effects.

20 Claims, 10 Drawing Sheets

(56) References Cited

U.S. PATENT DOCUMENTS

| | | | |
|---|---|---|---|
| 2002/0080514 A1* | 6/2002 | Richards | G11B 15/602 |
| | | | 360/77.03 |
| 2006/0256465 A1 | 11/2006 | Biskeborn | |
| 2014/0016226 A1* | 1/2014 | Bui | G11B 20/10009 |
| | | | 360/75 |
| 2021/0125633 A1* | 4/2021 | Jurneke | G11B 5/5928 |
| 2022/0180897 A1* | 6/2022 | Biskeborn | G11B 5/56 |
| 2022/0319540 A1* | 10/2022 | Biskeborn | G11B 5/00813 |

* cited by examiner

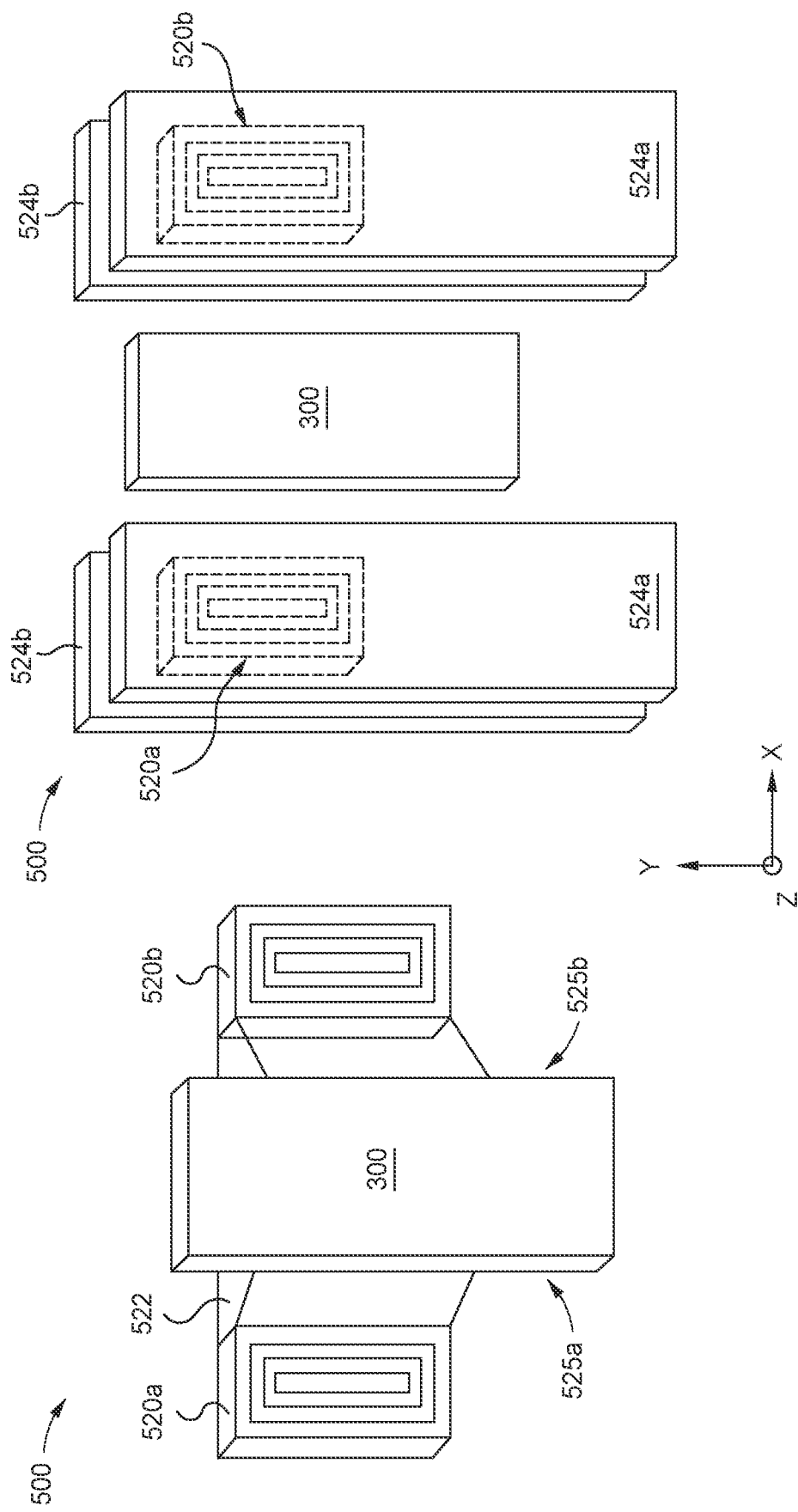

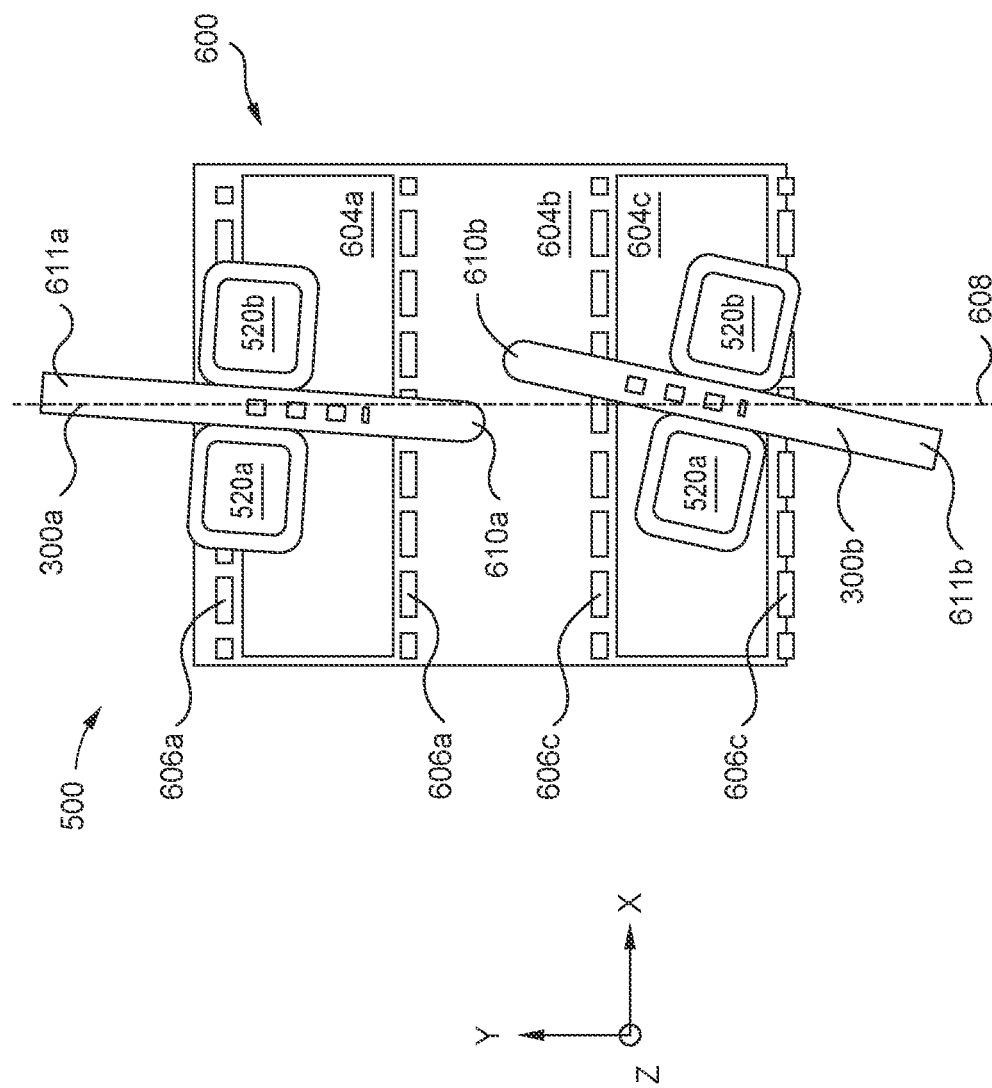

TAPE DRIVE HAVING INDEPENDENTLY CONTROLLED TILTING TANDEM TAPE HEADS

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape drive capable of accurate positioning tape heads over a tape dynamically.

SUMMARY OF THE DISCLOSURE

The present disclosure generally relates to a tape drive. The tape drive comprises a first tape head and a second tape head linearly aligned with one another, where the first tape head and the second tape head are configured to concurrently operate. The first tape head and the second tape head each comprises a plurality of write transducers, a plurality of read transducers, and a plurality of servo transducers. The tape drive further comprises a first actuator coupled to the first tape head and a second actuator coupled to the second tape head. The first and second actuators are configured to independently tilt and move the first and second tape heads, respectively. Tilting and moving the first and second tape heads individually enables the tape drive to compensate for non-linear tape dimensional stability effects.

In one embodiment, a tape drive comprises a first tape head, a second tape head disposed adjacent to the first tape head, a first actuator coupled to the first tape head, the first actuator configured to tilt the first tape head in a first direction and a second direction opposite the first direction, and to move the first tape head in a third direction perpendicular to the first direction and a fourth direction opposite the third direction, and a second actuator coupled to the second tape head, the second actuator configured to tilt the second tape head in the first direction and the second direction, and to move the second tape head in the third direction and the fourth direction.

In another embodiment, a tape drive comprises a first tape head, a second tape head disposed adjacent to the first tape head, wherein the first tape head and the second tape head are configured to concurrently write data to every other data band of a tape, a first actuator coupled to the first tape head, the first actuator configured to tilt and move the first tape head based on tape dimensional stability (TDS) effects of a first data band of the tape, and a second actuator coupled to the second tape head, the second actuator configured to tilt and move the second tape head based on TDS effects of a second data band of the tape, wherein a third data band of the tape is disposed between the first data band and the second data band.

In yet another embodiment, a tape drive comprises a first tape head, the first tape head comprising: a plurality of first write transducers, a plurality of first read transducers, and a plurality of first servo transducers. The tape drive further comprises a second tape head disposed adjacent to the first tape head, the first and second tape heads being configured to concurrently operate, wherein the first tape head and the second tape head are linearly aligned, and wherein the second tape head comprises: a plurality of second write transducers, a plurality of second read transducers, and a plurality of second servo transducers. The tape drive further comprises means for to tilting and moving the first tape head based on tape dimensional stability (TDS) effects of a first portion of a tape, and means for to tilting and moving the second tape head based on TDS effects of a second portion of the tape.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5C illustrate a perspective view of portions of a tape drive comprising the tape head of FIG. 3.

FIG. 6A illustrates the tape drive of FIG. 5 comprising tape heads of FIG. 3 concurrently writing data to a tape, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive. The tape drive comprises a first tape head and a second tape head linearly aligned with one another, where the first tape head and the second tape head are configured to concurrently operate. The first tape head and the second tape head each comprises a plurality of write transducers, a plurality of read transducers, and a plurality of servo transducers. The tape drive further comprises a first actuator coupled to the first tape head and a second actuator coupled to the second tape head. The first and second actuators are configured to independently tilt and move the first and second tape heads, respectively. Tilting and moving the first and second tape heads individually enables the tape drive to compensate for non-linear tape dimensional stability effects.

Figure 1A:
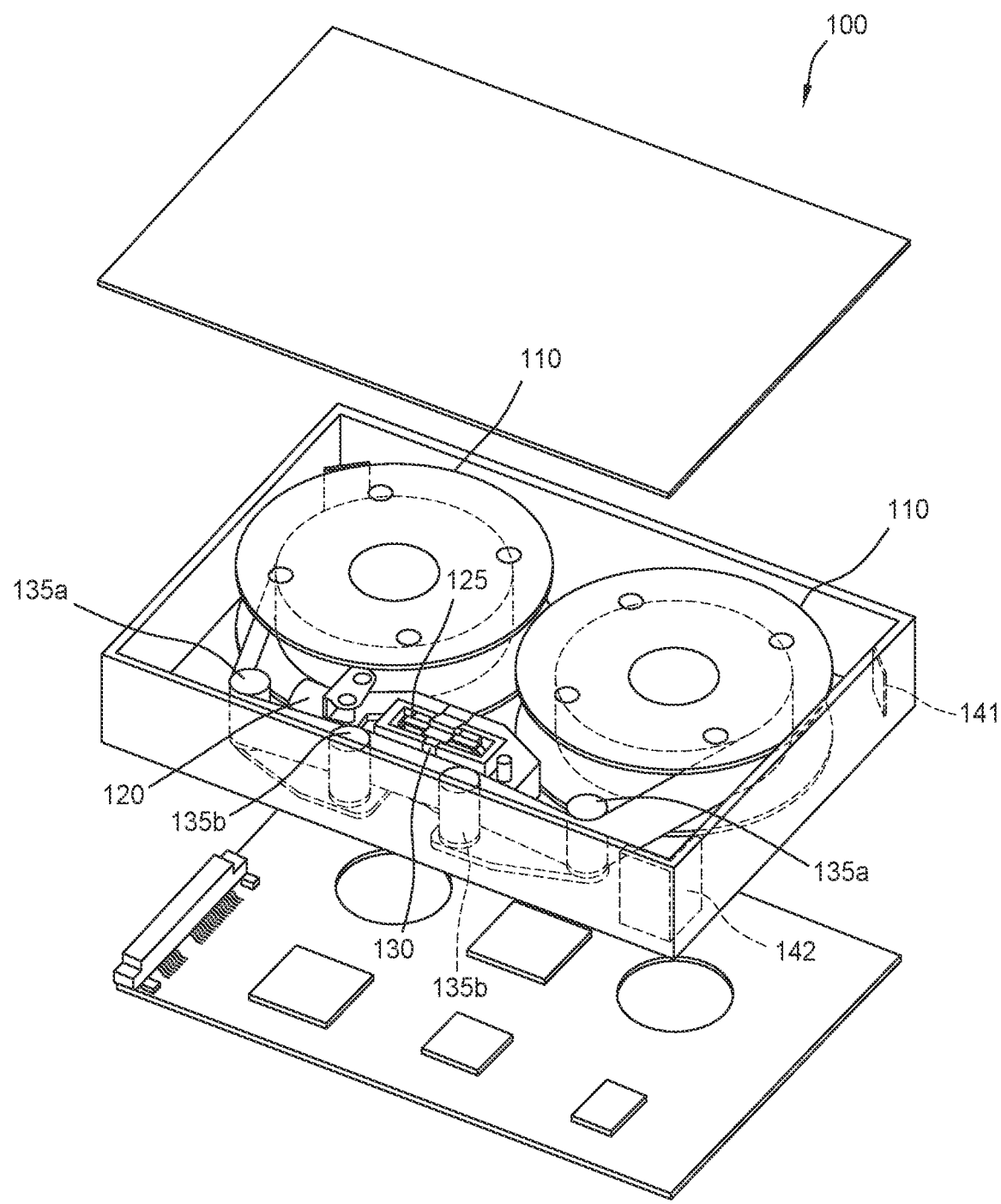
FIGS. 1A-1C illustrate a perspective exploded view, a simplified top down, and side profile view of a tape drive, in accordance with some embodiments.
Figure 1B:
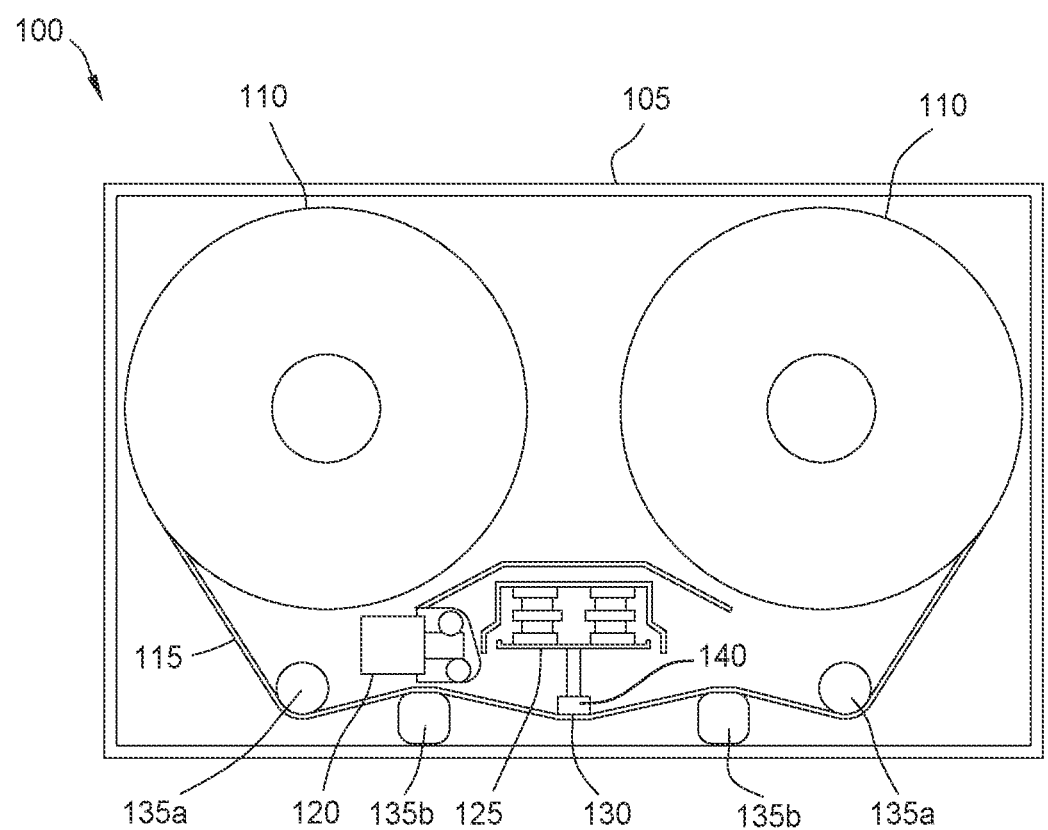
Figure 1C:
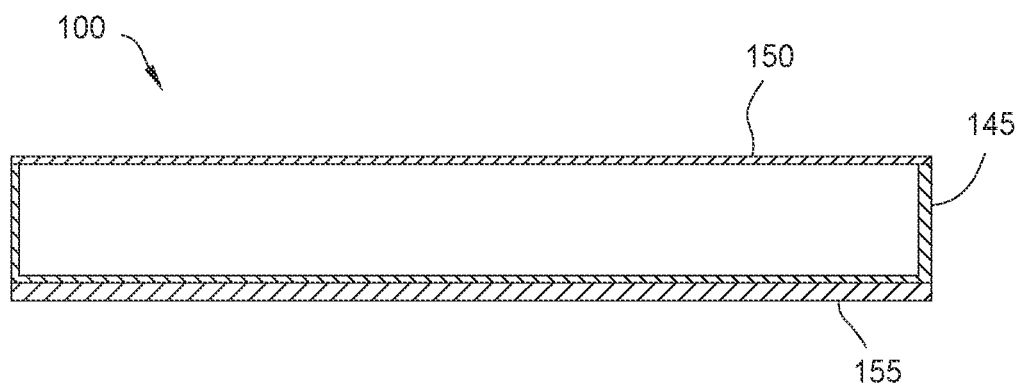

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
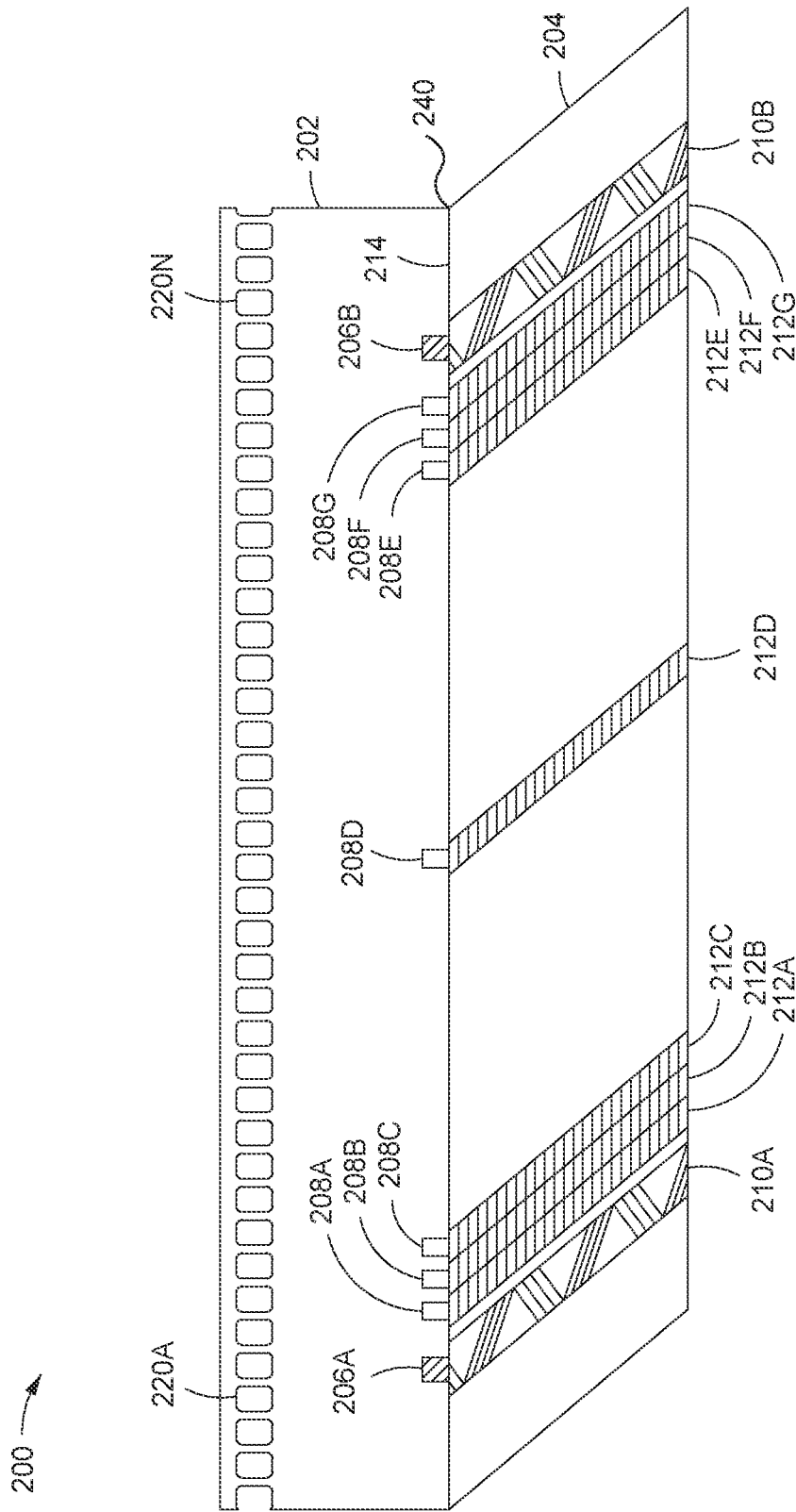
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller 240, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
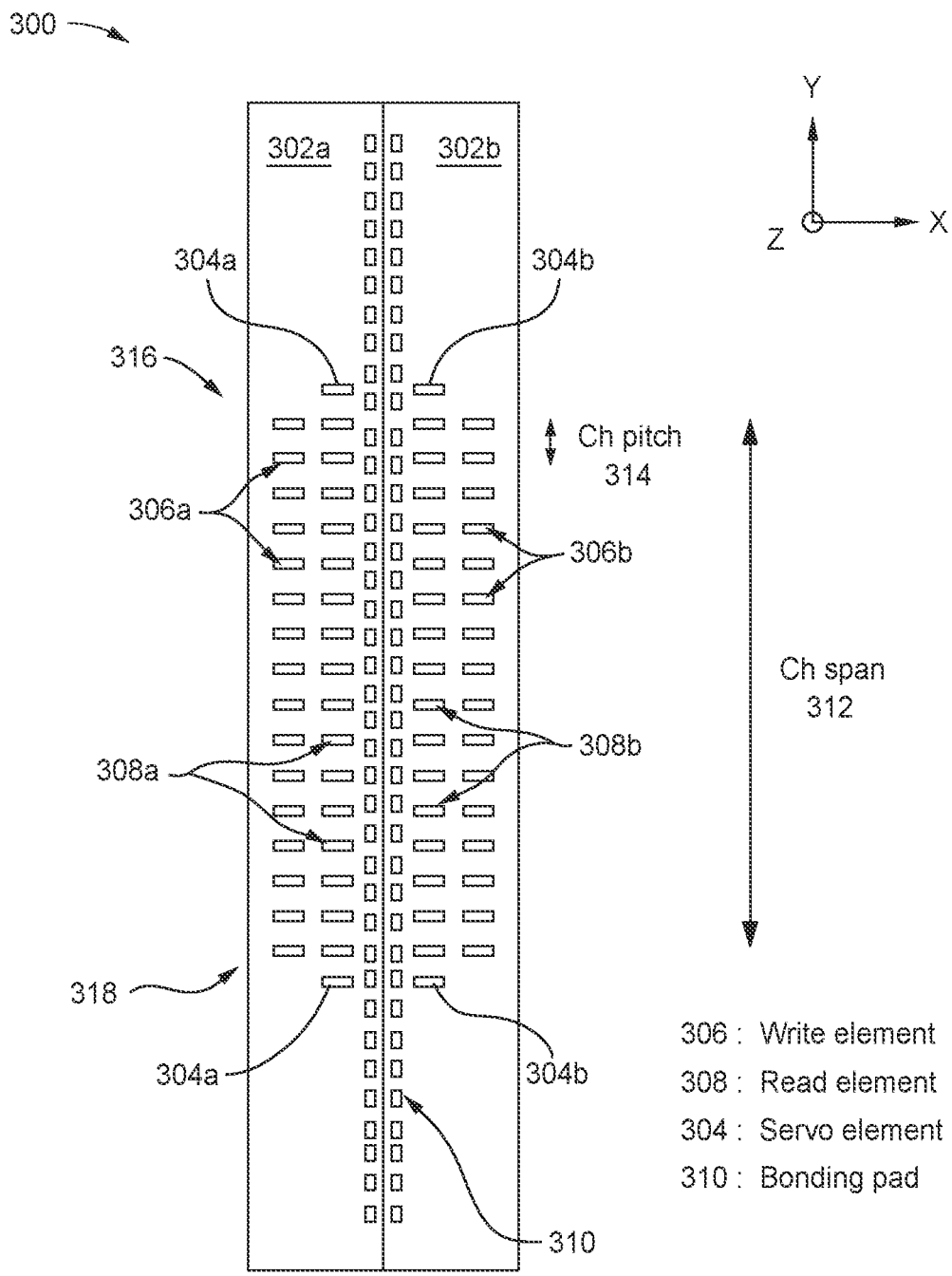
FIG. 3 illustrates a MFS view of a tape head, according to one embodiment.

FIG. 3 illustrates a MFS view of a tape head 300, according to one embodiment. The tape head 300 may be within a tape drive, such as the tape drive 100 of FIG. 1. The tape head 300 may be the tape head module assembly 200 of FIG. 2. While one tape head 300 is shown, a tape drive may comprise one or more tape heads 300, as discussed in FIGS. 6A-6B.

The tape head 300 comprises a first head assembly 302a coupled to a second head assembly 302b by a bonding pad 310. The first head assembly 302a comprises a plurality of write transducers 306a, a plurality of read transducers 308a, and one or more servo transducers 304a. For example, the first head assembly 302a comprising a first servo transducer 304a disposed at a first end 316 of the plurality of read transducers 308a and a second servo transducer 304a disposed at a second end 318 of the plurality of read transducers 308a. Each write transducer 306a is aligned in the y-direction, and each read transducer 308a is aligned in the y-direction and offset from the write transducers 306a in the x-direction. The servo transducers 304a are aligned in the y-direction with the read transducers 308a.

The second head assembly 302b comprises a plurality of write transducers 306b, a plurality of read transducers 308b, and one or more servo transducers 304b. The second head assembly 302b may comprise a first servo transducer 304b disposed at a first end 316 of the plurality of read transducers 308b and a second servo transducer 304b disposed at a second end 318 of the plurality of read transducers 308b. Each write transducer 306b is aligned in the y-direction, and each read transducer 308b is aligned in the y-direction and offset from the write transducers 306b in the x-direction. The servo transducers 304b are aligned in the y-direction with the read transducers 308b. While the first and second head assemblies 302a, 302b are each shown comprising two servo transducers 304a, 304b, the first and second head assemblies 302a, 302b may comprise additional servo transducers 304a, 304b.

The write transducers 306a, 306b may be referred to as write elements 306a, 306b, write heads 306a, 306b, or writers 306a, 306b. The read transducers 308a, 308b may be referred to as read elements 308a, 308b, read heads 308a, 308b, or readers 308a, 308b. The servo transducers 304a, 304b may be referred to as servo elements 304a, 304b or servo heads 304a, 304b. Additionally, the write transducers 306a, 306b may collectively be referred to as write transducers 306 (i.e., writers 306, write heads 306, or write elements 306), the read transducers 308a, 308b may collectively be referred to as read transducers 308 (i.e., readers 308, read heads 308, or read elements 308), and the servo transducers 304a, 304b may collectively be referred to as servo transducers 304 (i.e., servo heads 304). The servo heads 302 are configured to read servo data from a tape, such as the tape 204 of FIG. 2. The write heads 306 are configured to write data to a tape, and the read heads 308 are configured to read data from a tape.

Each write head 306a of the first head assembly 302a is aligned with an adjacent with a read head 308a in the x-direction, forming write head 306a and read head 308a pairs, and each write head 306b of the second head assembly 302b is aligned with an adjacent pair with a read head 308b in the x-direction, forming write head 306b and read head 308b pairs. Moreover, the write head 306a and read head 308a pairs of the first head assembly 302a are aligned in the x-direction with a write head 306b and read head 308b pair of the second head assembly 302b. As such, the spacing between each adjacent write head 306 and read head 308 pairs in both the first and second head assemblies 302a, 302b is referred to as a channel (ch) pitch 314. The channel pitch 314 between adjacent write head 306 and read head 308 pairs is the same for each write head 306 and read head 308 pair, and is the same for both the first and second head assemblies 302a, 302b. A channel span 312 is defined from a first write head 306 and read head 308 pair disposed at the first end 316 to the last write head 306 and read head 308 pair disposed at the second end 318.

Figures 4A, 4B:
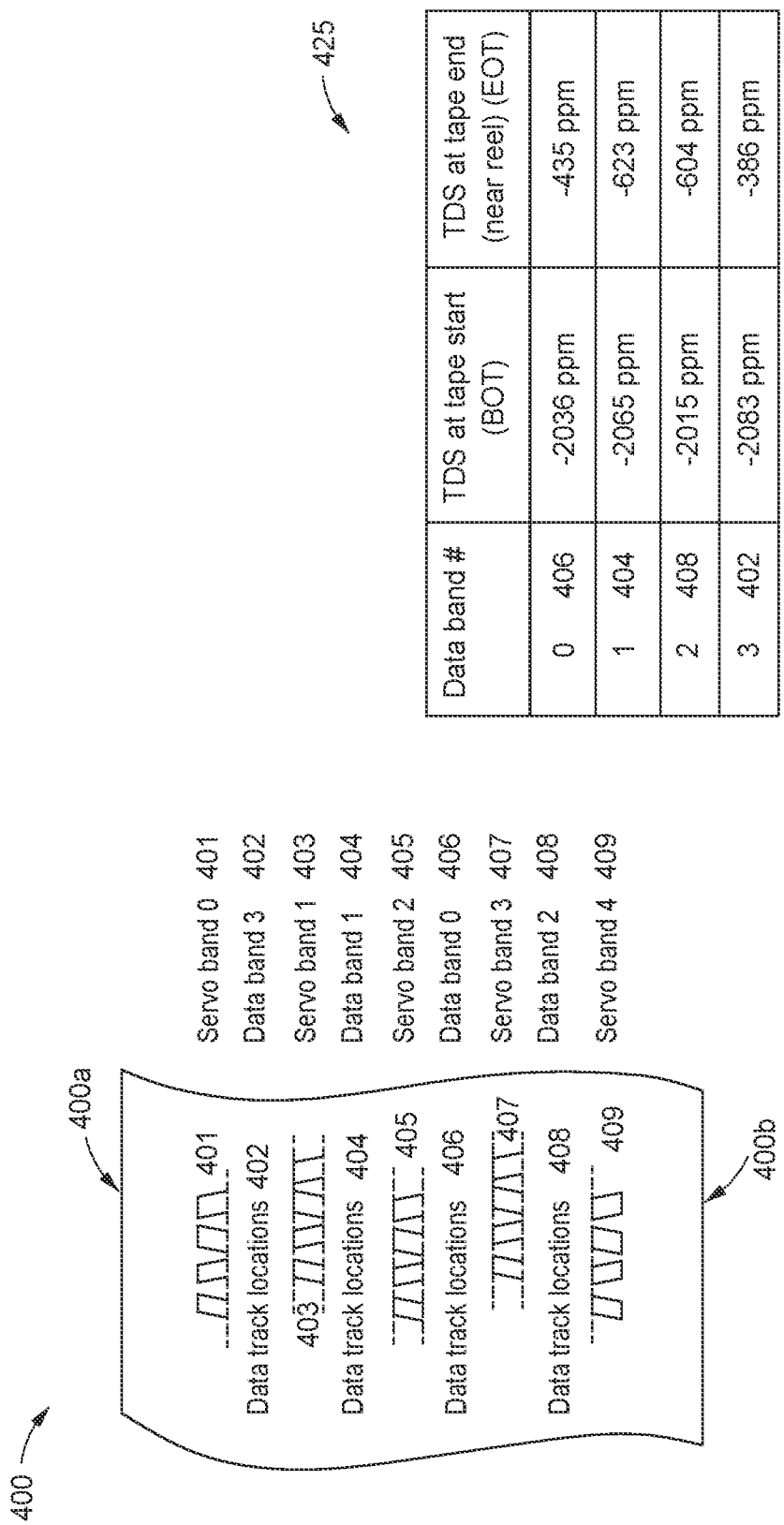
FIG. 4A-4B illustrate tape dimensional stability (TDS) effects occurring non-linearly from a beginning of a tape (BOT) to the end of the tape (EOT), according to one embodiment.
Figure 4C:
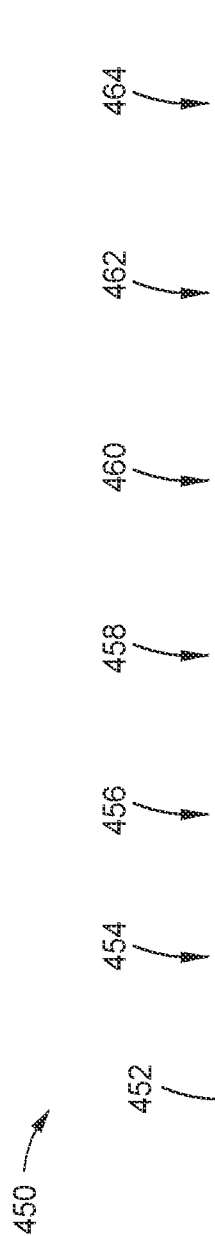
FIG. 4C illustrates a chart demonstrating non-linear TDS effects on five different tapes, according to one embodiment.

FIGS. 4A-4B illustrate tape dimensional stability (TDS) effects occurring non-linearly from a beginning of a tape (BOT) to the end of the tape (EOT), according to one embodiment. FIG. 4A illustrates a tape 400 experiencing non-linear TDS effects, according to one embodiment. FIG. 4B illustrates a chart 425 showing the non-linear TDS effects of the tape 400 of FIG. 4A. FIG. 4C illustrates a chart 450 demonstrating non-linear TDS effects on five different tapes, according to one embodiment.

The tape 400 illustrates data bands 402, 404, 406, and 408, each separated by a servo band, 401, 403, 405, 407, and 409. Data band 3 402 is disposed a first edge 400a of the tape 400, data band 1 404 and data band 0 406 are disposed near a center of the tape 400, and data band 3 408 is disposed near a second edge 400b of the tape 400. Each data band 402, 404, 406, and 408 extend along a length of the tape 400.

The chart 425 of FIG. 4B illustrates the varying TDS effects experience by the different data bands 402, 404, 406, 408 depending on the location of the data bands on the tape 400. For example, data band 2 408, disposed near a center of the tape 400, experiences less TDS effects at the beginning on the tape 400 than data band 3 402, but experiences more TDS effects at the end of the tape 400. As shown in the chart 425, the width of the tape 400 at the first edge 400a, center, and second edge 400b varies over the length of the tape 400. As such, the TDS effects on the tape 400 as a whole as non-linear (e.g., the first edge 400a and the second edge 400b of the tape 400 may be wider than a center of the tape 400). Non-linear TDS effects may be harder to compensate for than linear TDS effects as the tape varies in width over the length of the tape 400.

In the chart 450 of FIG. 4C demonstrating non-linear TDS effects on five different tapes, the first column 452 shows which tape 1-5 each characteristic corresponds to, the second column 454 shows the tracks per inch (TPI) (k) of each tape 1-5, the third column 456 shows the channel span (µm) of each tape 1-5, the fourth column 458 shows the track pitch (nm) of each tape 1-5, the fifth column 460 shows the number of tracks per channel span of each tape 1-5, the sixth column 462 shows the max error by TDS (µm), and the seventh column 464 shows the error ratio to track pitch (TP).

As shown by the chart 450, as the TPI (column 454) and the number of tracks per channel span (column 460) increase, and as the track pitch (column 458) decreases, the error ratio to track pitch (column 464) increases. As such, tapes having higher TPI, higher numbers of tracks per channel spans, and lower track pitches are more susceptible to TDS effects, which may be non-linear.

Figure 5C:
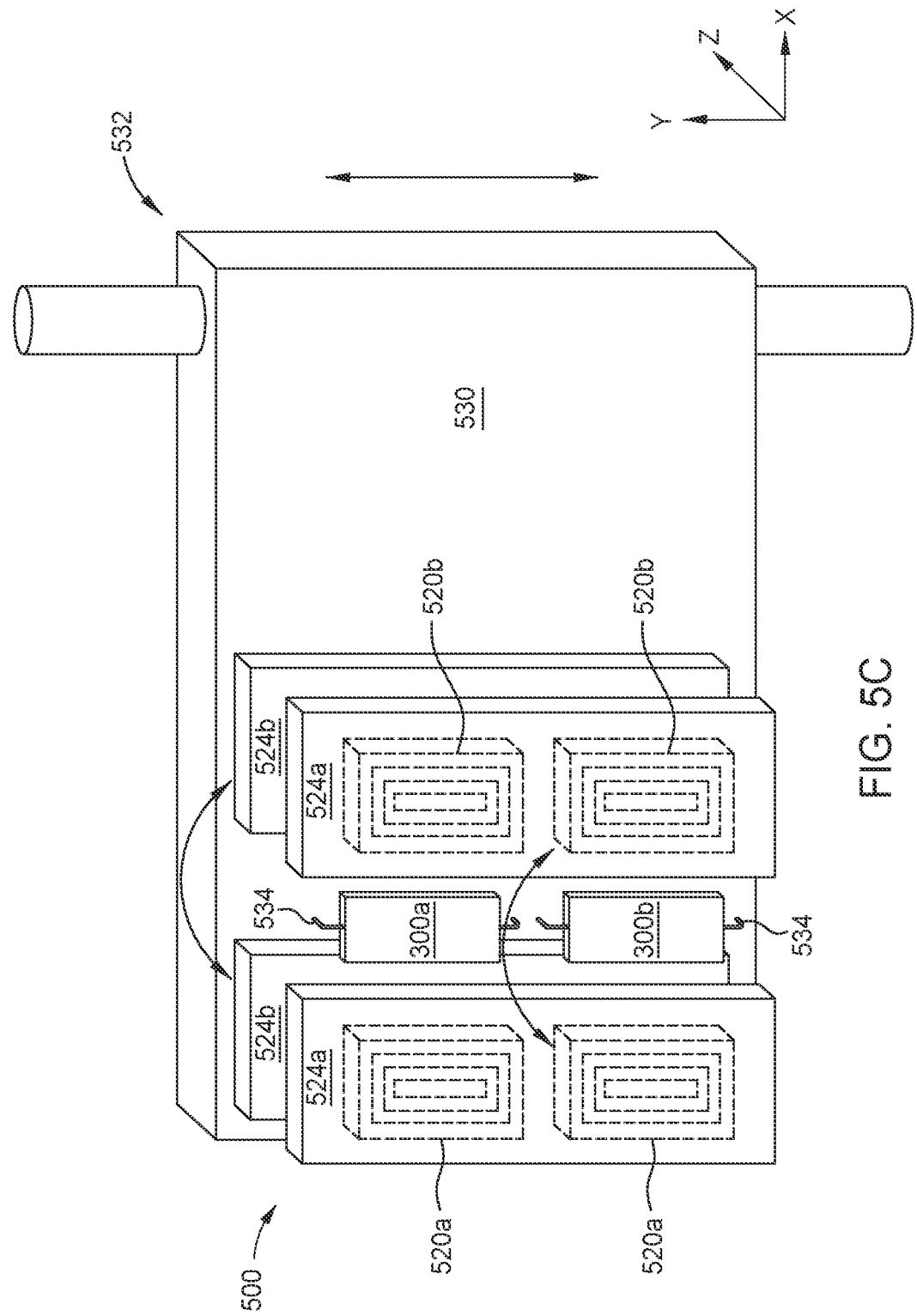

FIGS. 5A-5C illustrate a perspective view of portions of a tape drive 500 comprising the tape head 300 of FIG. 3. The tape drive 500 may be the tape drive 100 of FIG. 1. While one tape head 300 is shown in FIGS. 5A-5B, a tape drive may comprise one or more tape heads 300, as discussed in FIGS. 6A-6B. Any cables and/or cable routing of the one or more tape heads 300 of the tape drive 500 are not shown for clarity.

FIG. 5A illustrates the tape head 300 being mounted on a fixture 522. A first VCM coil 520a is coupled to the fixture 522 on a first side 525a of the tape head 300, and a second VCM coil 520b is coupled to the fixture 522 on a second side 525b of the tape head 300. Both the first and second VCM coils 520a, 520b are sandwiched between a first magnet 524a and a second magnet 524b, as shown in FIG. 5B. For clarity, the fixture 522 is not shown in FIG. 5B. The VCM coils 520a, 520b may collectively be referred to as VCM coil(s) 520, and the first magnet 524a and the second magnet 524b may collectively be referred to as magnets 524. Thus, each tape head 300 in the tape drive 500 comprises two VCM coils 520 and four magnets 524. The four magnets 524 of each tape head 300 may be adhered to a common substrate (not shown).

The VCM coils 520 and the magnets 524 function as an actuator to move the tape head 300 and/or fixture 522 linearly and/or rotationally. Thus, the VCM coils 520 and the magnets 524 enable to the tape head 300 to tilt in the x-direction and the −x-direction as well as to move in the y-direction and the −y-direction. In some embodiments, one or more tape heads 300 may share the four magnets 524. For example, a first VCM coil 520a of a first tape head 300 and a first VCM coil (not shown) of a second tape head (not shown) may each be sandwiched between the first and second magnets 524a, 524b. The VCM coils 520 are independent to each actuator of each tape head 300 because each VCM coil 520 has a unique coil current path/control, and thus, tilting of each tape head 300 can be independently controlled. However, the magnets 524 can be shared between two actuators of two tape heads as long as VCM coil current can be independently managed. As such, four magnets 524 may be utilized by two separate tape heads 300 at once, allowing the both tape heads to be independently tilted or moved as necessary.

FIG. 5C illustrates the tape drive 500 comprising a first tape head 300a and a second tape head 300b, according to one embodiment. As shown in FIG. 5C, each tape head 300a, 300b is coupled two VCM coils 520a, 520b. Each VCM coil 520a, 520b is disposed between and coupled to two magnets 524a, 524b. The tape heads 300a, 300b, the VCM coils 520a, 520b, and the magnets 524a, 524b are disposed on a platform 530 of a stepper motor (of which only a connective portion 532 to the platform 530 is shown) or actuator. More specifically, the magnets 524a, 524b are disposed in contact with and coupled to the platform 530. The tape heads 300a, 300b are coupled to the platform 530 by one or more flexures 534 extending from each end of the tape heads 300a, 300b not coupled to the VCM coils 520a, 520b.

The stepper motor moves the first and second tape heads 300a, 300b, along with the VCM coils 520a, 520b and magnets 524a, 524b, in a first direction above a tape, such as vertically up and down in the y-direction or the −y-direction. The stepper motor moves the first and second tape heads 300a, 300b together, as further discussed below. Each tape head 300a, 300b is configured to independently tilt or move in a second direction perpendicular to the first direction, for example, in the x-direction and in the −x-direction, using the VCM coils 520a, 520b. Thus, the stepper motor enables the first and second tape heads 300a, 300b to move together over a tape, and the VCM coils 520a, 520b coupled to each tape head 300a, 300b enable the tape heads 300a, 300b to tilt or move independently over the tape. FIG. 5C is for exemplary purposes only, and is not shown drawn to scale.

Figure 6B:
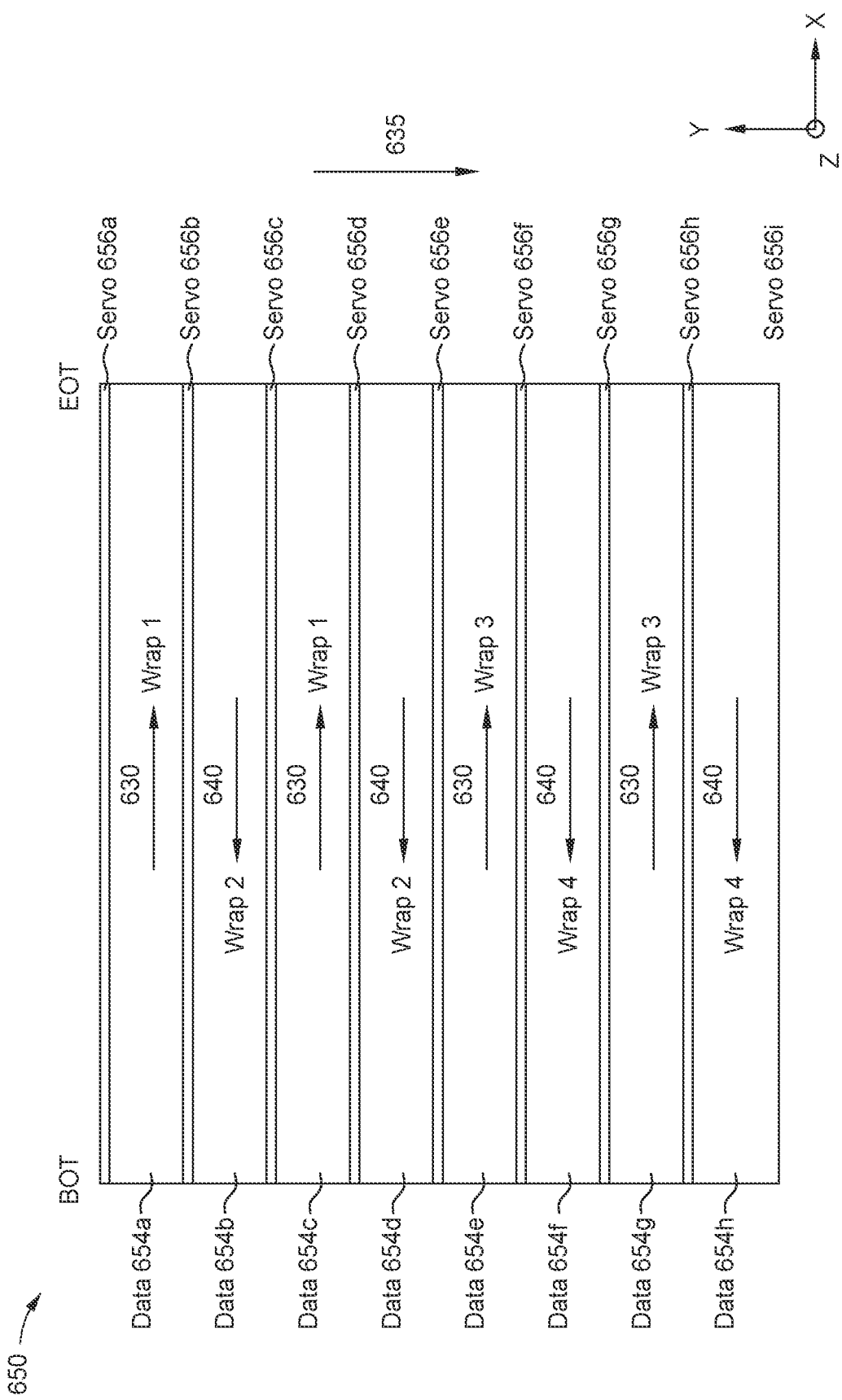
FIG. 6B illustrates how the tape drive of FIG. 6A writes data to a tape, according to another embodiment.

FIG. 6A illustrates a tape drive 500 comprising tape heads 300a, 300b (which may correspond to tape head 300 of FIG. 3 in some embodiments) concurrently writing data to a tape 600, according to one embodiment. FIG. 6B illustrates how the tape drive 500 of FIG. 6A writes data to a tape 650, according to another embodiment. The tape 600 of FIG. 6A comprises a plurality of data bands 604a-604c and a plurality of servo bands 606a-606c. In the embodiment of FIG. 6A, each data band 604a-604c is disposed between two servo bands 606a-606c. However, in some embodiments, all of the data bands 604a-604c may be disposed between only two servo bands 606a-606c. Furthermore, while three data bands 604a-604c and four servo bands 606a-606c are shown in FIG. 6A, the tape 600 may comprise any number of data bands and any number of servo bands. As such, the number of data bands 604a-604c and the number of servo bands 606a-606c are not intended to be limiting.

In one embodiment, the tape drive 500 comprises a first tape head 300a and a second tape head 300b, where each tape head 300a, 300b is the tape head 300 of FIG. 3, and comprises the first and second head assemblies 302a, 302b (not shown). More generally, in other embodiments, the tape heads used in the tape drive 500 may differ from tape head 300 shown in FIG. 3. For example, the tape heads may have a different number of head assemblies which may have different numbers, combinations, and/or arrangements of various transducer elements than as shown in FIG. 3. For simplicity, regardless of actual compositions, the tape heads are referred to as tape head 300a, 300b to illustrate the actuation mechanisms. Moreover, each tape head 300a, 300b comprises the first VCM coil 520a, the second VCM coil 520b, four magnets 524 (not shown), and a fixture 522 (not shown). The magnets 524 and the fixture 522 are not shown in FIG. 6A for clarity. As such, aspects of FIGS. 5A-5C will be referred to with respect to FIG. 6A. The first tape head 300a and the second tape head 300b are configured to operate concurrently, and are linearly aligned in the y-direction.

As discussed in FIGS. 5A-5C, each tape head 300a, 300b is coupled to a fixture 522, and the VCM coils 520a, 520b are also coupled to the fixture 522. Two magnets 524 couple each VCM coil 520a, 520b. The VCM coils 520a, 520b may collectively be referred to as VCM coil(s) 520. The VCM coils 520 and the magnets 524 of each tape head 300a, 300b function as independent actuators to individually move each tape head 300a, 300b linearly and/or rotationally. Thus, the first and second tape heads 300a, 300b move independently from one another in both the x-direction and the y-direction, and write and read data concurrently.

As shown in FIG. 6A, the first tape head 300a writes data to a first data band 604a of a tape 600, and the second tape head 300b simultaneously writes data to a third data band 604c (or other data band that is not disposed adjacent to the first data band 604a) of the tape 600. Based on the servo data 606a of the first data band 604a, the first tape head 300a moves in the x-direction and/or the y-direction to accurately write data to the tape 600. The servo data 606a of the first data band 604a provides positioning information for the first tape head 300a, which may include any linear or non-linear TDS effects. Thus, using the servo data 606a, the actuator (i.e., the VCM coils 520 and magnets 524) of the first tape head 300a positions the first tape head 300a appropriately to write data to the first data band 604a, taking into consideration and TDS effects. For example, the first tape head 300a is tilted or offset from a center axis 608 of the tape heads 600a, 600b in the x-direction. In some embodiments, the first tape head 300a is statically tilted at an angle of about 5° to about 8° with respect to the center axis 608.

Similarly, based on the servo data 606c of the third data band 604c, the second tape head 300c moves in the x-direction and/or the y-direction to accurately write data to the tape 600. The servo data 606c of the third data band 604c positioning information for the second tape head 300c, which may include any linear or non-linear TDS effects. Thus, using the servo data 606c, the actuator (i.e., the VCM coils 520 and magnets 524) of the second tape head 300b positions the second tape head 300b appropriately to write data to the third data band 604c, taking into consideration linear and non-linear TDS effects. For example, the second tape head 300b is tilted or offset from the center axis 608 of the tape heads 600a, 600b in the x-direction a greater amount than the first tape head 300a. In some embodiments, the second tape head 300b is statically tilted at an angle of about 5° to about 8° with respect to the center axis 608. The first tape head 300a and the second tape head 300b may each individually be statically tilted at an angle of about 5° to about 8° with respect to the center axis 608. Even when the first and second tape heads 300a, 300b are statically tilted, both the first and second tape heads 300a, 300b are still configured to individually tilt.

The first tape head 300a writes to the first data band 604a and the second tape head 300b concurrently writes to the third data band 604c, leaving at least the second data band 604b spaced between the tape heads 300a, 300b. The tape heads 300a, 300b concurrently write every other data band 604a, 604c (or in some embodiments, every third data band) to allow for sufficient space between the data heads 300a, 300b to prevent interactions or interference from occurring between the data heads 300a, 300b and the tape 600. Moreover, the first tape head 300a comprises a first end 611a and a second end 610a, and the second tape head 300b comprises a first end 611b and a second end 610b. The second end 610a of the first tape head 300a is disposed adjacent to the second end 610b of the second tape head 300b. In some embodiments, the second ends 610a, 610b of each tape head 300a, 300b are beveled or blended to prevent the second ends 610a, 610b of each tape head 300a, 300b from contacting or damaging the tape 600. In some embodiments, the first ends 611a, 611b of each tape head 300a, 300b are beveled or blended as well.

When the stepper motor moves the tape drive 500 up or down in the y-direction or –y-direction, the first and second tape heads 300a, 300b move simultaneously. In some embodiments, the spacing between the second end 610a of the first tape head 300a and the second end 610b of the second tape head 300b is fixed in the vertical or y-direction, which enables the stepper motor to move the first and second tape heads 300a, 300b together. Thus, while the first and second tape heads 300a, 300b may tilt in the x-direction and the –x-direction independently, the tape heads 300a, 300b do not move further apart in the y-direction or vertically. In other embodiments, the first tape head 300a and the second tape head 300b are configured to move independently in the y-direction as needed. FIG. 6A illustrates the first and second tape heads 300a, 300b being positioned as close to one another as allowed without interfering or colliding together. However, the first and second tape heads 300a, 300b may each move in the y-direction and the –y-direction to be spaced further apart from one another.

FIG. 6B illustrates how the tape drive 500 of FIG. 6A writes data to a tape 650, according to another embodiment. The tape 650 comprises a plurality of data bands 654a-654h and a plurality of servo bands 656a-656i. In the embodiment of FIG. 6B, each data band 654a-654h is disposed between two servo bands 656a-656i. However, in some embodiments, all of the data bands 654a-654h may be disposed between only two servo bands 656a-656i. Furthermore, while three data bands 654a-654h and four servo bands 656a-656i are shown in FIG. 6B, the tape 650 may comprise any number of data bands and any number of servo bands. As such, the number of data bands 654a-654h and the number of servo bands 656a-656i are not intended to be limiting.

The first and second tape heads 300a, 300b are configured to write data to the tape 656 in a serpentine manner. For example, the first tape head 300a reads the first servo band 656a and/or the second servo band 656b to position the first write head 300a to write data to the first data band 654a while the tape 650 moves in a first direction 630 (e.g., the x-direction). Concurrently, the second tape head 300b reads the third servo band 656c and/or the fourth servo band 656d to position the second write head 300b to write data to the third data band 654c while the tape 650 moves in the first direction 630 (e.g., the x-direction). The first and second tape heads 300a, 300b writing to the first and third data bands 654a, 654c, respectively, is referred to as wrap 1. The first and/or second tape heads 300a, 300b may tilt in the x-direction or move in the y-direction as needed to compensate for TDS effects. As noted above, the second data band 654b is not written to during wrap 1 in order to allow for sufficient space between the first and second tape heads 300a, 300b. Thus, the first and second tape heads 300a, 300b concurrently write to every other data band.

Upon reaching the end of the tape 650, the tape 650 or the first and second tape heads 300a, 300b may then be moved by the stepper motor as described above in a second direction 635 perpendicular to the first direction 630 (e.g., the –y-direction). The first tape head 300a then reads the second servo band and/or the third servo band 656c to position the first write head 300a to write data the second data band 654b while the tape 650 moves in a third direction 640 opposite the first direction 630 (e.g., the –x-direction). Concurrently, the second tape head 300b reads the fourth servo band 656d and/or the fifth servo band 656e to position the second write head 300b to write data to the fourth data band 654d while the tape 650 moves in the third direction 640 (e.g., the –x-direction). The first and second tape heads 300a, 300b writing to the second and fourth data bands 654a, 654c, respectively, is referred to as wrap 2. The first and/or second tape heads 300a, 300b may tilt in the x-direction or move in the y-direction as needed to compensate for TDS effects. The third data band 654c was previously written to during wrap 1, and thus, is skipped during wrap 2 in order to allow for sufficient space between the first and second tape heads 300a, 300b.

The tape drive 500 continues to move in the second direction 635 each time an end (i.e., BOT or EOT) of the tape 650 is reached, and proceeds to write data to alternating data bands as the tape 650 moves in either the first direction 630 or the third direction 640. For example, during wrap 3, the first tape head 300a writes data to the fifth data band 654e while the second tape head 300b writes data to the seventh data band 654g as the tape moves in the first direction 630. During wrap 4, the first tape head 300a writes data to the sixth data band 654f while the second tape head 300b writes data to the eighth data band 654h as the tape moves in the third direction 640.

While the tape drive 500 is described as writing individual data bands, the first and second tape heads 300a, 300b may write data to one data band, respectively, in the serpentine manner. For instance, the tape 650 may move in the first, second, and third directions 630, 635, 640 multiple times while the first tape head 300a writes data to various portions of the first data band 654a and while the second tape head 300b writes data to various portions of the third data band 654c.

By utilizing two tape heads within a tape drive, where each tape head is configured to independently tilt or move, linear and/or non-linear TDS effects may be accurately compensated for. As such, tapes that experience various levels of TDS effects, such as portions of the tape expanding while other portions of the tape contracting, the tapes can still be written to and read from precisely by taking into consideration the varying conditions of the portions of the tapes.

In one embodiment, a tape drive comprises a first tape head, a second tape head disposed adjacent to the first tape head, a first actuator coupled to the first tape head, the first actuator configured to tilt the first tape head in a first direction and a second direction opposite the first direction, and to move the first tape head in a third direction perpendicular to the first direction and a fourth direction opposite the third direction, and a second actuator coupled to the second tape head, the second actuator configured to tilt the second tape head in the first direction and the second direction, and to move the second tape head in the third direction and the fourth direction.

The first tape head and the second tape head are configured to concurrently write data to every other data band of a tape. The first tape head and the second tape head are linearly aligned. A first end of the first tape head is disposed adjacent to a first end of the second tape head. The first end of the first tape head is beveled. The first end of the second tape head is beveled. The first tape head and the second tape head are each individually statically tilted about 5° to about 8°. The first and second actuators each individually comprises two VCM coils and one or more magnets. The first actuator is configured to tilt and move the first tape head different amounts than the second actuator is configured to tilt and move the second tape head when the first and second tape heads concurrently write data to a tape. The first and second actuators independently move the first and second tape heads based on tape dimensional stability effects of the tape.

In another embodiment, a tape drive comprises a first tape head, a second tape head disposed adjacent to the first tape head, wherein the first tape head and the second tape head are configured to concurrently write data to every other data band of a tape, a first actuator coupled to the first tape head, the first actuator configured to tilt and move the first tape head based on tape dimensional stability (TDS) effects of a first data band of the tape, and a second actuator coupled to the second tape head, the second actuator configured to tilt and move the second tape head based on TDS effects of a second data band of the tape, wherein a third data band of the tape is disposed between the first data band and the second data band.

A first end of the first tape head is beveled, a first end of the second tape head is beveled. The first beveled end of the first tape head is disposed adjacent to the first beveled end of the second tape head. The first tape head comprises a plurality of first servo transducers. The second tape head comprises a plurality of second servo transducers. The plurality of first servo transducers are configured to read first servo data of the tape to determine the TDS effects of the first data band. The plurality of second servo transducers are configured to read second servo data of the tape to determine the TDS effects of the second data band. The first tape head and the second tape head are linearly aligned.

The first actuator comprises a first VCM coil, a first magnet, and a second magnet disposed on a first side of the first tape head, and a second VCM coil, a third magnet, and a fourth magnet disposed on a second side of the first tape head opposite the first side. The first and second magnets sandwich the first VCM coil. The third and fourth magnets sandwich the second VCM coil. The second actuator comprises a third VCM coil disposed on a first side of the second tape head, and a fourth VCM coil disposed on a second side of the second tape head opposite the first side. The first and second magnets sandwich the third VCM coil. The third and fourth magnets sandwich the fourth VCM coil. The first actuator is configured to tilt the first tape head in a first direction and a second direction opposite the first direction. The second actuator is configured to tilt the second tape head in the first direction and the second direction.

In yet another embodiment, a tape drive comprises a first tape head, the first tape head comprising: a plurality of first write transducers, a plurality of first read transducers, and a plurality of first servo transducers. The tape drive further comprises a second tape head disposed adjacent to the first tape head, the first and second tape heads being configured to concurrently operate, wherein the first tape head and the second tape head are linearly aligned, and wherein the second tape head comprises: a plurality of second write transducers, a plurality of second read transducers, and a plurality of second servo transducers. The tape drive further comprises means for to tilting and moving the first tape head based on tape dimensional stability (TDS) effects of a first portion of a tape, and means for to tilting and moving the second tape head based on TDS effects of a second portion of the tape.

The plurality of first servo transducers are configured to read first servo data of the tape to determine the TDS effects of the first portion. The plurality of second servo transducers are configured to read second servo data of the tape to determine the TDS effects of the second portion. A first end of the first tape head is beveled, a first end of the second tape head is beveled. The first beveled end of the first tape head is disposed adjacent to the first beveled end of the second tape head. The first tape head and the second tape head are configured to concurrently write data to every other data band of the tape. The means for to tilting and moving the first tape head is configured to tilt the first tape head in a first direction and a second direction opposite the first direction. The means for to tilting and moving the second tape head is configured to tilt the second tape head in the first direction and the second direction.

While the foregoing is directed to embodiments of the present disclosure, other and further embodiments of the disclosure may be devised without departing from the basic scope thereof, and the scope thereof is determined by the claims that follow.

What is claimed is:

1. A tape drive, comprising:
a first tape head;
a second tape head disposed adjacent to and linearly aligned with the first tape head in a direction perpendicular to a direction of movement of a tape;
a first actuator coupled to the first tape head, the first actuator configured to tilt the first tape head in a first direction and a second direction opposite the first direction, and to move the first tape head in a third direction perpendicular to the first direction and a fourth direction opposite the third direction; and
a second actuator coupled to the second tape head, the second actuator configured to tilt the second tape head in the first direction and the second direction, and to move the second tape head in the third direction and the fourth direction.

2. The tape drive of claim 1, wherein the first tape head and the second tape head are configured to concurrently write data to every other data band of the tape.

3. The tape drive of claim 1, and wherein a first end of the first tape head is disposed adjacent to a first end of the second tape head.

4. The tape drive of claim 3, wherein the first end of the first tape head is beveled, wherein the first end of the second tape head is beveled, and wherein the first tape head and the second tape head are each individually statically tilted about 5° to about 8°.

5. The tape drive of claim 1, wherein the first and second actuators each individually comprises two VCM coils and one or more magnets.

6. The tape drive of claim 1, wherein the first actuator is configured to tilt and move the first tape head different amounts than the second actuator is configured to tilt and move the second tape head when the first and second tape heads concurrently write data to the tape.

7. The tape drive of claim 6, wherein the first and second actuators independently move the first and second tape heads based on tape dimensional stability effects of the tape.

8. The tape drive of claim 1, wherein a first end of the first tape head is rounded, a first end of the second tape head is rounded, wherein the first rounded end of the first tape head is disposed adjacent to the first rounded end of the second tape head.

9. A tape drive, comprising:
a first tape head;
a second tape head disposed adjacent to the first tape head;
a first actuator coupled to the first tape head, the first actuator configured to tilt the first tape head in a first direction and a second direction opposite the first direction, and to move the first tape head in a third direction perpendicular to the first direction and a fourth direction opposite the third direction; and
a second actuator coupled to the second tape head, the second actuator configured to tilt the second tape head in the first direction and the second direction, and to move the second tape head in the third direction and the fourth direction, wherein the first and second actuators each individually comprises two VCM coils and one or more magnets.

10. The tape drive of claim 9, wherein the first tape head and the second tape head are configured to concurrently write data to every other data band of a tape.

11. The tape drive of claim 9, wherein the first tape head and the second tape head are linearly aligned, and wherein a first end of the first tape head is disposed adjacent to a first end of the second tape head.

12. The tape drive of claim 9, wherein the first tape head and the second tape head are each individually statically tilted about 5° to about 8°.

13. The tape drive of claim 9, wherein a first end of the first tape head is rounded, a first end of the second tape head is rounded, and wherein the first rounded end of the first tape head is disposed adjacent to the first rounded end of the second tape head.

14. The tape drive of claim 9, wherein the first actuator is configured to tilt and move the first tape head different amounts than the second actuator is configured to tilt and move the second tape head when the first and second tape heads concurrently write data to a tape, and wherein the first and second actuators independently move the first and second tape heads based on tape dimensional stability effects of the tape.

15. A tape drive, comprising:
a first tape head;
a second tape head disposed adjacent to the first tape head;
a first actuator coupled to the first tape head, the first actuator configured to tilt the first tape head in a first direction and a second direction opposite the first direction, and to move the first tape head in a third direction perpendicular to the first direction and a fourth direction opposite the third direction; and
a second actuator coupled to the second tape head, the second actuator configured to tilt the second tape head in the first direction and the second direction, and to move the second tape head in the third direction and the fourth direction, wherein the first actuator is configured to tilt and move the first tape head different amounts than the second actuator is configured to tilt and move the second tape head when the first and second tape heads concurrently write data to a tape.

16. The tape drive of claim 15, wherein the first and second actuators independently move the first and second tape heads based on tape dimensional stability effects of the tape.

17. The tape drive of claim 15, wherein the first tape head and the second tape head are configured to concurrently write data to every other data band of a tape.

18. The tape drive of claim 15, wherein the first tape head and the second tape head are linearly aligned, and wherein a first end of the first tape head is disposed adjacent to a first end of the second tape head.

19. The tape drive of claim 15, wherein a first end of the first tape head is rounded, a first end of the second tape head is rounded, and wherein the first rounded end of the first tape head is disposed adjacent to the first rounded end of the second tape head.

20. The tape drive of claim 15, wherein the first tape head and the second tape head are each individually statically tilted about 5° to about 8°.

* * * * *